United States Patent
Witzel et al.

(10) Patent No.: US 9,538,361 B2
(45) Date of Patent: Jan. 3, 2017

(54) METHODS AND APPARATUSES FOR REGISTERING A TERMINAL IN THE IMS OVER A CIRCUIT-SWITCHED ACCESS DOMAIN

(75) Inventors: Andreas Witzel, Herzogenrath (DE); Ralf Keller, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 2339 days.

(21) Appl. No.: 12/312,347

(22) PCT Filed: Sep. 7, 2007

(86) PCT No.: PCT/EP2007/007814
§ 371 (c)(1),
(2), (4) Date: Nov. 6, 2009

(87) PCT Pub. No.: WO2008/055559
PCT Pub. Date: May 15, 2008

(65) Prior Publication Data
US 2010/0046501 A1    Feb. 25, 2010

Related U.S. Application Data

(60) Provisional application No. 60/864,489, filed on Nov. 6, 2006.

(51) Int. Cl.
*H04L 12/66* (2006.01)
*H04W 8/06* (2009.01)
*H04L 29/08* (2006.01)
*H04W 4/14* (2009.01)
*H04W 80/10* (2009.01)
*H04L 29/06* (2006.01)

(52) U.S. Cl.
CPC ............... *H04W 8/06* (2013.01); *H04L 67/04* (2013.01); *H04L 65/1016* (2013.01); *H04L 65/1073* (2013.01); *H04W 4/14* (2013.01); *H04W 80/10* (2013.01)

(58) Field of Classification Search
CPC .......... H04W 8/06; H04W 4/14; H04W 80/10; H04L 67/04; H04L 65/1016; H04L 65/1073
USPC .................. 370/355, 356, 431, 437
See application file for complete search history.

(56) References Cited

U.S. PATENT DOCUMENTS

2007/0058788 A1* 3/2007 Mahdi et al. .............. 379/88.17
2007/0091877 A1* 4/2007 Lundin et al. ............... 370/353

OTHER PUBLICATIONS

3GPP SA WG2: "Digital cellular telecommunications system (Phase 2+); Universal Mobile Telecommunications System (UMTS); IP Multimedia Subsystem (IMS); Stage 2 (3GPP TS 23.228 version 7.5.0 Release 7) ETSI TS 123 228" Sep. 2006.

* cited by examiner

Primary Examiner — Luat Phung

(57) ABSTRACT

The invention provides a solution for registering a terminal having a packet-switched and circuit-switched functionality in a packet-switched service domain, such as the IMS over a circuit-switched access domain. In particular it is proposed to send a packet-switched registration message packed in a circuit-switched transport bearer (USSD) to a circuit node (HLR, MSC, dispatcher) which selects an adapter node (IA) being responsible for performing a registration in the packet-switched service domain on behalf of the user using the information provided with the packet-switched registration message and by deriving and adding additional information.

24 Claims, 11 Drawing Sheets

METHODS AND APPARATUSES FOR REGISTERING A TERMINAL IN THE IMS OVER A CIRCUIT-SWITCHED ACCESS DOMAIN

This application claims the benefit of U.S. Provisional Application No. 60/864,489, filed Nov. 6, 2006, the disclosure of which is fully incorporated herein by reference.

TECHNICAL FIELD

The present invention relates to a telecommunication solution for a terminal being in a first domain, e.g. circuit-switched domain and having a service provider providing a service via a second domain, e.g. packet-switched domain, such as IMS.

BACKGROUND

Third Generation (3G) Networks such as UMTS (Universal Telecommunication Network) and CDMA 2000 provide high-speed wireless Internet access to mobile users over a wide coverage area. For the 3G networks the IP Multimedia Subsystem IMS, standardised by the Third Generation Partnership Project (3GPP), has been defined to support voice and multimedia services. The strength of IMS is the provision of enhanced services, for example multimedia services combining voice and data over packet-switched technology, in particular IP-network. The usage of IP-network as a single underlying standard allows an easy and fast service deployment. Furthermore the IMS is also a network architecture, servicing both fixed and mobile terminals which seamlessly integrates into the ubiquitous IP environment, including the Internet and other packet-switched based networks.

A number of mobile communication networks, such as GSM, are based on a circuit-switched technology, wherein both the access domain and the service domain are based on circuit-switched technology.

Due to the fact that service providers shift their core network infrastructure from the circuit switched domain to a consolidated common packet switched infrastructure, the need occurs to enable the consistent provision of services to subscribers over a variety of accesses domains including circuit-switched CS and packet switched PS accesses and different service domains. Therefore common controlling platforms are introduced, like the IP Multimedia Subsystem (IMS) for providing enhanced services for the multitude of different service domains that may be available for an individual call and between which the user might be switched, wherein it is to be ensured that choice of a service domain remains transparent to the user.

A solution for consistently routing calls from a CS network access through the IMS network to the IMS service domain is currently investigated by the 3GPP. The work item is called IMS Centralized Services (ICS) and aims at moving all subscribers to the IMS for a harmonization of the service (see 3GPP TSG SA WG2 Architecture—SA2#5, Sophia Antipolis, France, 28 Aug. to 1 Sep. 2006, Tdoc S2-063335).

The aim of the ICS is to be able to handle users accessing or being served by different service domains, like for example to handle a user having a subscription in a first domain, like IMS, and being in a coverage of a second domain, like for example circuit-switched domain.

The ICS concept requires the installation of the so called ICS client application providing the functionality for routing between domains. Currently, two alternatives for the placing of the ICS client application are investigated. According to the first approach, network-centric concept, the ICS client application is introduced in the network, for example on a Mobile Switching Centre (MSC) or on an MSC server (MSC-S). The second approach proposes to introduce the ICS client application in the terminal.

In 3GPP TSG SA WG2 Architecture, 28-30 Mar., 2006 in Munich, "USSD based call flows" a mechanism for attaching an IMS user via a legacy network is mentioned. It describes to use a Voice Call Continuity VCC application, for combining CS and PS functionality. The VCC application is an IMS functionality located in an IMS node in the IMS domain. Therefore the cited document proposes to integrate the functionality for the translation between the CS domain and the IMS domain into an internal node of the IMS domain. Consequently the IMS has to distinguish whether a user is an IMS or a CS user in order to handle them in a different manner. Further therein it is described to use Unstructured Supplementary Service Data (USSD) in the CS domain for attaching an end terminal to the VCC application. However the cited document does not provide a complete solution for performing IMS registration after a CS attached procedure is finished.

SUMMARY

It is an object to provide a technique that realise a unified service domain. In particular it is object of the present invention to provide an efficient solution for providing packet-switched services for a user being in a circuit-switched access network.

The invention is embodied in independent claims. Advantageous embodiments are described in the dependent claims.

According to a first aspect, a method is proposed for registering a terminal in a packet-switched service domain over a circuit-switched access domain, which comprises a circuit-switched network part. The method comprises, on the circuit-switched network part, the steps of receiving a packet switched service domain registration message packed in a circuit-switched transport bearer; selecting an adapter node for handling the terminal, in response to the received message by determining an adapter node's identifier and, sending the packet switched registration message by means of circuit-switched transport bearer towards the selected adapter node.

According to an other aspect, a method is provided for registering a terminal in a packet-switched service domain over a circuit-switched access domain, which is to be performed in an adapter node. Said method comprises the steps of; receiving a packet switched service domain registration message packed in a circuit-switched transport bearer from the circuit-switched network node and contacting a handler for handling a conversion of the received packet switched service domain registration message into a message of the packet-switched service domain and initiating a registration procedure towards the packet-switched service domain by means of a packet-switched proxy functionality.

Another aspect of the present invention proposes to provide circuit-switched network node for registering a terminal in a packet-switched service domain over the circuit-switched access domain. In particular it is proposed that said node comprises a receiver adapted to receive a packet switched service domain registration message packed in a circuit-switched transport bearer from the terminal and a selection component adapted to select an adapter node on the basis of the received message by determining an adapter node's identifier. Further a sender is provided being adapted to handle the terminal and a sender adapted to send the packet switched service domain registration message packed in the circuit-switched transport bearer towards the selected adapter node.

According to a further aspect of the invention it is proposed to provide an adapter node for registering a terminal in a packet-switched service domain having a circuit-switched access, the adapter node comprising a receiver for receiving a packet switched service domain registration message packed in a circuit-switched transport bearer from the circuit-switched network node and a handler for handling a conversion of the received packet switched service domain registration message into a message of the packet-switched service domain and a registration component for initiating a registration procedure towards the packet-switched service domain by means of a packet-switched proxy functionality.

Further the adapter node is adapted to perform all steps as claimed in connection with the method which is to be performed in said node.

According to a further aspect of the invention it is proposed to provide a system for registering a terminal in a packet-switched service domain having a circuit-switched access, the system comprising: a terminal adapted to generate and to send a packet-switched service domain registration message packed in a circuit-switched bearer to a circuit-switched node wherein the terminal is also adapted to receive and store an adapter node's identifier.

Further it is proposed that the system comprises a circuit-switched network part adapted to receive the packet-switched service domain registration message, to select an adapter node by determining an adapter node's identifier and to send it to said adapter node. The system has also an adapter node adapted to receive the packet-switched service domain registration message; to convert the packet-switched service domain registration message into a message of the packet-switched service domain by contacting a handler having subscriber related data, to initiate a registration of the terminal in the packet-switched service domain and to provide the terminal with the adapter node's identifier.

According to a further aspect of the invention it is proposed to provide a terminal for initiating a registering of said terminal in a packet-switched service domain via a circuit-switched access, wherein said terminal comprises a packet-switched functionality, the terminal comprising: a message generator for generating a packet-switched registration message wherein the message generator is adapted to determine whether an adapter node's identifier is available and in case the address is available to include it into the packet-switched registration message, a sender for sending the packet-switched registration message packed in a circuit-switched transport bearer towards a circuit-switched node. The terminal has also a receiver for receiving the adapter node's identifier and for storing said identifier.

The advantage of the present invention is the achieved transparency, since for the packet switched service domain the fact that the subscriber is in a circuit-switched domain remains transparent due to the fact that the conversion of the protocols is done before contacting the first node of the packet-switched domain, which is the packet-switched proxy functionality and which is part of the adapter node. The proxy functionality performs the registration using the parameters of the packet-switched service domain on behalf of the user.

A further advantage is that to a user having a terminal with a packet-switched functionality and being in a CS-access network a solution is provided to access the packet-switched services via the CS-domain.

Therefore the invention emulates for the packet-switched service domain a usual packet-switched terminal because for the packet-switched domain the fact that the terminal is in a circuit-switched domain is hidden.

DETAILED DESCRIPTION

Figure 1:
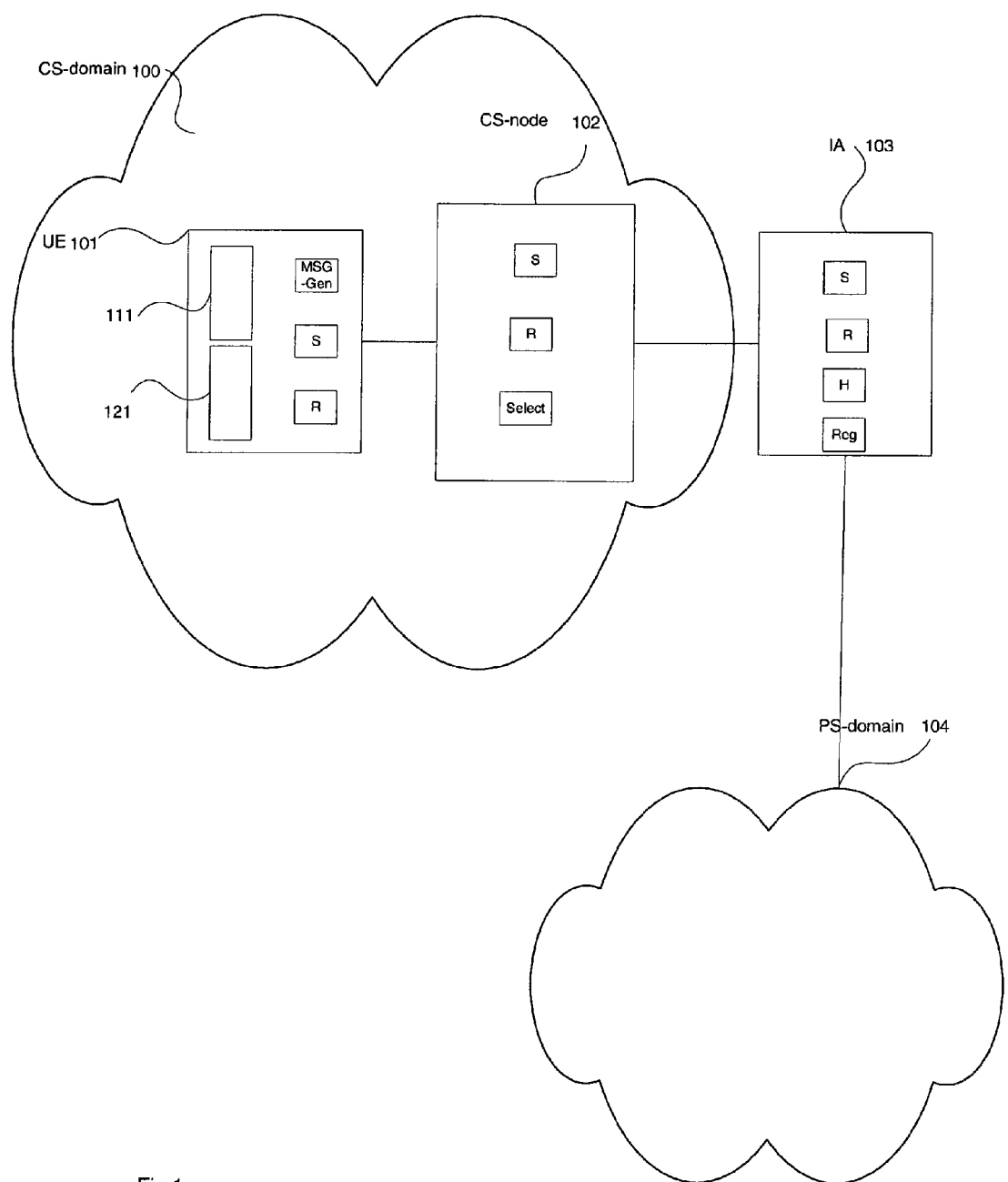
FIG. 1 is block diagram illustrating embodiments of network.

In the following preferred examples of the present invention shall be described in detail, in order to provide the skilled person with thorough and complete understanding of the invention, but these detailed embodiments only serve as examples of the invention and are not intended to be limiting.

It should be noted that the term "part", "node", or "component" in the context of the present invention refers to any suitable combination of hardware and software for providing a predetermined functionality in the communication network. In this way, said terms generally refers to a logical entity that can be spread out over several physical entities of the network, but can also refer to a physical entity located in one physical location.

Furthermore a "part", "node" or "component" in the context of the present invention refers to any entity in a telecommunication network, which is to be configured in an appropriate way in order to support a provided service.

Preferably, the circuit-switched access network might be a mobile communication network, e.g. a mobile communication network operating according to GSM, GPRS (General Packet Switched Radio) or UMTS (Universal Mobile Telephone System) or any wireless system like for example EDGE, WCDMA, CDMA2000 or it might be also a W-LAN.

Preferably, the packet-switched service domain is an IMS service domain, however this should not be seen as limitation, than the present invention can also be practiced in other unified service domains different that encompassed by IMS.

The terminal is a terminal having functionality for accessing the packet-switched network. Preferably, it is a terminal with an integrated IMS client providing IMS functionality for accessing IMS service domain. Further said terminal has functionality to use a circuit-switched access in case said access is available to the terminal.

The circuit-switched network part comprises a first circuit-switched network part forwarding the packet switched service domain registration message packed in a circuit-switched transport bearer to a second circuit-switched network part for selecting an adapter node. For example a MSC might have the functionality for handling a circuit-switched transport bearer, but limited to the home subscriber and when a roaming subscriber is recognised as such then it is proposed to forward the registration to a register located in a home domain, like the HLR, for selecting an adapter node. According to the present invention the circuit-switched network part either selects a corresponding adapter node or it might decide to forward it to a next circuit-switched network part. For example the HLR, from the example above, might forward the registration message to a dispatcher for selecting an adapter node. It is to be noted that these are merely examples showing that the circuit-switched network part might comprises more than one node, wherein in this case the registration message is to be forwarded.

The packet switched service domain registration message might be realised in any preferably and suitable way providing the adapter node with the content necessary for the registration. For example it might be a SIP IMS registration message. According to the present invention said message is to be packed in a circuit-switched transport bearer such as USSD having the advantage that the complete information is provided to the domain adapter. In order to save transmission resources, it is proposed in one embodiment to filter out unnecessary or redundant information and to compress the SIP IMS registration message. At the end the registration message might not have the format of a standardised SIP message. In this case it is the task of the adapter node to recover the received registration message into the SIP format.

In a further embodiment it is proposed that the packet switched service domain registration message is an indication message indicating a request for a packet switched service domain registration, wherein the format of the message might be defined in a way so that it is possible to generate a message according to the format of the packet-switched service domain.

In an another embodiment it is proposed to use the so-called IMS centric (ICS) approach with the ICS protocol as described in 3GPP TSG SA WG2 Architecture-SA#5, Sophia Antipolis, France, 28 Aug. to 1 Sep. 2006. According to the present invention it is proposed to pack the message of this protocol into the circuit-switched transport bearer.

Further, it is proposed that in one scenario, the described registration is an initial registration, by means of which a subscriber gets access to the services provided in the packet-switched service domains. In other scenario it is proposed to use the claimed invention for a re-registration purpose, wherein a re-registration is performed when a user is already registered to a service and merely a frequent re-registration is to be carried out to ensure that the user is still interested in accessing the services and still available. Therefore, if not explicitly indicated, no differentiation between the registration and the re-registration procedures is made in the present description.

The registration might be performed via a call independent transaction, wherein a registration message packed in a circuit-switched bearer might be sent independent of an ongoing call with the advantage that it might be sent whenever it is required.

In other embodiment it is proposed to combine the registration procedure with a location update which is to be performed periodically in a circuit-switched network part. Herein a sparing dealing with the transmission resources is achieved.

In other embodiment the present invention proposes to perform the registration procedure within an ongoing call. Herein the defined messages and procedures of the circuit-switched transport bearer are to be used in order to integrate the registration into an ongoing call. This might be for example applicable, when the registration has to be done while a subscriber is having a voice call ongoing. Herein as well a sparing dealing with the transmission resources is achieved.

The circuit-switched network part upon receiving the registration message packed in a circuit-switched transport bearer, determines the corresponding adapter node, wherein in particular an identifier of said node is to be derived. Preferably also a handler address for the terminal within said node is also provided, so that a handling of the re-registration might be carried out in more efficient way.

The determination of the corresponding adapter node might be performed in any suitable and preferable way. According to one embodiment, the circuit-switched network part might apply a weighted load-sharing approach by taking into consideration the current work load of each of the available adapter node in order to overcome an overload in said node.

In a further embodiment the circuit-switched network part might have a pre-configured correlation between the registering terminal and the adapter node. For example, in the GSM system the subscriber's terminal has a so-called IMEI number, which is known to the HLR and the MSC, also the MSISDN is known to the HLR and the MSC; and according to the series of the known numbers, a correlation to the adapter nodes might be established.

Further in case the terminal has already the adapter node's identifier due to the previously performed registration, said identifier provided by the terminal might be used.

Summarizing, in a preferred embodiment the adapter node's identifier is a unique identifier identifying the adapter node. Preferably the adapter node's identifier comprises an adapter node address and unique handler identification for a terminal inside the adapter node. However the identifier might be only the address of the adapter node. Different embodiments of the adapter node's address might be provided, like a network wide unique identifier. In the present invention the term adapter node's identifier covers the described different embodiments.

In a preferred embodiment, the circuit-switched node when receiving a user's request, maps it into the adapter node's identifier, wherein this mapping is stored in the circuit-switched node. In other preferred embodiment, the request might include directly an adapter node's identifier.

The circuit-switched transport bearer might be any bearer which is able to transport the packet-switched registration message. Thus, it might be a new defined protocol or an already existing one, which might be re-used in the context of the present invention. For example in GSM, the so-called Unstructured Supplementary Service Data (USSD) is existing and suitable for this purpose. The USSD is a capability built into the GSM standard for support of transmitting information over signalling channels of the GSM network. Thus, the USSD is so-called transport bearer transporting service messages over existing signalling protocols. In the following the USSD will be described in the embodiments, however it will readily be apparent that other suitable transport bearers might be used instead thereof.

Further it is proposed that the circuit-switched network part has a circuit-switched network application handling the circuit-switched transport bearer. In the embodiment, where the USSD is used as a transport bearer, the circuit-switched network application is a USSD application. The task of said application is to handle the received packet switched service domain messages packed in a circuit-switched transport bearer according to the content of the received circuit-switched transport bearer message, like the USSD service code, which describes what is to be done with the received message.

Further, it is proposed that the adapter node comprises packet-switched proxy functionality for handling the protocols of the packet-switched service domain. Considering the IMS embodiment, it is proposed to integrate the P-CSCF functionality into the adapter node, wherein the proxy call session control function (P-CSCF) acts as an outbound SIP proxy. For the subscriber, it is the first contact point in the IMS.

For the sake of completeness, the IMS has also an I-CSCF. The interrogating call session control function (I-CSCF) is the contact point in the home network communicating on one side with the P-CSCF and on the other side with an S-CSCF, which is the serving call session control function. For example in order to access services a user must register in the IMS, wherein the registration is done by sending a SIP REGISTER message through the call functions while providing said functions for example with the identity and contact address of the IMS user.

Further it is also proposed that the handler comprises subscriber related data. This might comprise also an address of the next node in the circuit-switched and in the packet-switched domain in order to be able to forward ongoing and incoming calls. Thus, it might be for example the address of the handling MSC in the GSM and of the handling S-CSCF in the IMS. The personal subscriber data might further comprise the so called International Mobile Subscriber Identity (IMSI) which is a unique user identity that is stored in the SIM. To improve the privacy, a Temporary Mobile Subscriber Identity (TMSI) is generated per geographical location. While IMSI/TMSI is used for user's identification, the IMEI is a unique device identity and is phone specific. The MSISDN is the telephone number of a user. With IMS, additional identities are introduced for the user; IP Multimedia Private Identity (IMPI) and IP Multimedia Public Identity (IMPU). To participate in multimedia sessions, an IMS subscriber must register at least one IMPU with the IMS. The private identity is used for authentication purposes. There are mechanisms existing for deriving IMPI and IMPU addresses from an IMSI address. The above-mentioned examples should illustrate that there might be different subscriber related data which might be handled and stored in the handler. Summarizing, the term subscriber's related data in the frame of the present invention should be understand broadly comprising different data, like user's related data (IMSI/TMSI), terminals related data (IMPU) or network's related data needed for forwarding calls related to a user (MSC address).

Preferably, the adapter node (IA) sends the adapter node's identifier towards the terminal, so that the terminal might use this identifier to re-register directly without consulting a circuit-switched node for identifying the responsible adapter node.

Further it is proposed to provide a circuit-switched node being adapted to perform the method steps as described above according to the aspect of the invention describing the method to be performed in the circuit-switched network node.

In particular, it is to be mentioned that the node has a circuit-switched network part with functionality allowing performing the steps as mentioned above. In particular said network part has functionality for handling a circuit-switched transport bearer. Said node might be a single node understanding the circuit-switched transport bearer, for example a HLR or a MSC or a dispatcher. Further said node might comprises more than one circuit-switched node, wherein the nodes are adapted to communicate with each other.

In one embodiment it is proposed that the circuit-switched network node is a HLR being adapted to communicate with an adapter node and to receive the registration message initiated by the terminal. Thus, this might occur when a user is in a visited network and the HLR is contacted via a MSC in order to register the user in the IMS. Another example may be when the MSC in the home network does not support the functionality for registering a user in the IMS, then the registration message might be forwarded to the HLR for initiating the registration procedure.

In another embodiment MSC is adapted to perform all the steps according to the present invention. This might be the case when a subscriber is in a home network and the MSC supports the claimed functionality.

Further, in an other embodiment it is proposed that the circuit switched network node comprises additionally a dispatcher for selecting an adapter node, wherein said dispatcher has a communication unit for communicating with a further circuit-switched node, like for example a HLR or a MSC forwarding the registration message to the dispatcher in order to select a corresponding adapter node.

Further it is proposed that the packet-switched proxy functionality is either integrated in the adapter node or it might be co-located in a physical separate node. Independent on the implementation the adapter node provides a consolidated functionality.

Preferably, the Session Initiation Protocol SIP has been chosen as an embodiment of a protocol for transporting a registration message in the IMS. SIP is a signaling protocol used between the IMS user's equipment UE and the IMS as well as between the components within the IMS. The IMS uses SIP also to complete voice and multimedia calls in the Internet.

Further it is to be noted that the USSD messages are service related messages which are to be transported via a corresponding protocol on the different communication links, like the corresponding payload layer. For example in GSM between the terminal and the MSC the Direct Transfer Application Part (DTAP) transport protocol is defined. This might be used to transport the USSD messages on this link. Further between the MSC and HLR a so called Mobile Application Part (MAP) protocol is standardized and this protocol might be used for transporting USSD messages between these nodes. However since the adapter node is a new node there are no standard transport protocols existing in the circuit switched network, therefore it is proposed to introduce new interface functionality on this link.

Preferably MAP might be used on this interface as well, but also other IP based transport protocols can be thought of.

FIG. 1 illustrates a circuit-switched domain 100 and a packet-switched service domain 104 with an adapter node 103 providing a conversion of the registration message between the circuit-switched domain 100 and a packet-switched service domain 104. The circuit-switched service domain comprises a terminal (UE) 101 and a circuit-switched network part (CS-Node) 102. The terminal (UE) has a packet-switched functionality 111 and a circuit-switched functionality 121. Further it comprises a message generator MsgGen, a sender S and a receiver R. The message generator MsgGen generates a packet-switched registration message packed in a circuit-switched transport bearer and the sender S sends it packed in a circuit-switched transport bearer toward the CS node. The receiver R receives an identifier of the IA node and it also can receive further information like the format of the circuit-switched transport bearer (like the USSD service code).

In the following embodiments, wherein GSM/GRPRS or UMTS are examples for the circuit-switched domain, the circuit-switched functionality 111 will be called USSD application. The IMS and in particular the centric approach of IMS (ICS) is taken as an example for a packet-switched service domain, therefore in the following the packet-switched functionality 121 will be called ICS client.

The CS-node 102 comprises a sender S adapted to receive a registration message packed in circuit-switched transport bearer. Further it comprises a selection component Select adapted to perform a selection of an appropriate adapter node (IA) 103 and a sender (S) adapted to send the registration message to the selected adapter node.

The adapter node (IA) 103 comprises a receiver R adapted to receive a registration message, a handler H adapted to perform the conversion between the CS-transport bearer and the PS-message, wherein the conversion comprises also the converting of the addresses used in the different domains. Further the IA 103 comprises a registration component (Reg) adapted to initiate a PS-registration in the PS-domain 104.

It is assumed that the terminal (UE) initiates a registration procedure, which is triggered when the UE detects for example that packet-switched PS coverage is not available, or the cell broadcast shows that the PS access is not capable for conversational PS access, or when the operator set corresponding preferences or when no radio access network capability is given. Further the UE might trigger the registration procedure over circuit-switched domain, when the UE has tried PS access but the resulting speech quality was too bad so it fallbacks to circuit-switched CS access. Further example might be when the user initiates explicitly this procedure or said user has defined the CS access as a preferred one. Also the choice of the CS access might be made location based, depending whether it is home network or roaming network, or it might be even based on cell location. In other embodiment it might be defined that whenever CS access is available, it should be taken. These are mainly some examples when a terminal having PS capability might decide to use circuit-switched access. However since these are merely some possible examples, they might be also other situation and therefore, the examples should not be seen as any limitation for the present invention.

When a UE detects or decides that a CS access is to be used, then in a next step it sends a PS registration message packed in a CS transport bearer, like for example a USSD message to a CS node. In the following, the USSD protocol is taken as an example for the circuit-switched transport bearer.

USSD is described within the GSM standard in the documents GSM 02.90 (USSD Stage 1) and GSM 03.90 (USSD Stage 2). A USSD message includes a content, the so-called USSD service Code, which identifies the steps which are to be taken when receiving said message, for example "123" might be a call forwarding service and an other description might be defined for performing a registration in IMS, since the USSD is a supplementary services, the offerings are standardized. These services are accessible by the terminal without the need for the subscriber to know the codes. However the service codes are to be known in the network, for example the HLR has to know what the service code means. For example it might interpret "123" as "sending it to a next node".

Figure 2:
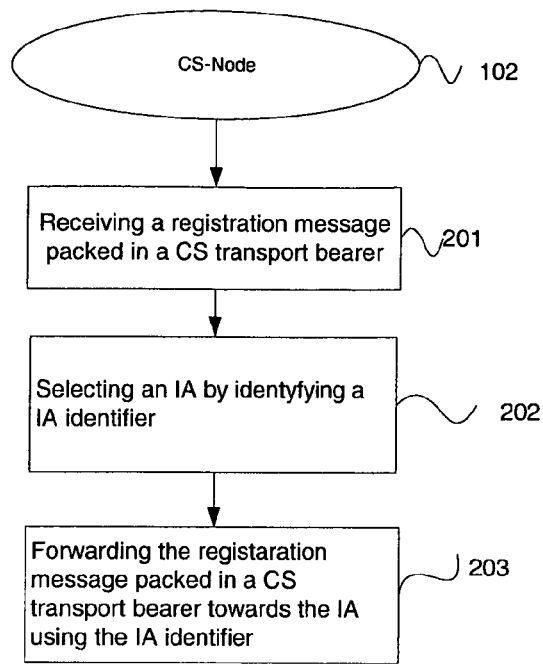
FIGS. 2 and 3 are flowcharts illustrating embodiments of the method steps performed correspondingly in the circuit-switched network node and in the service adapter node.

FIG. 2 shows a flow chart of a first method embodiment of the present invention. The method as illustrated in FIG. 2 may be practiced by the circuit-switched node CS-node 102 shown in FIG. 1 or by any other CS node.

According to FIG. 2, in the first step the PS registration message is received, 201. In order to receive said message, the CS-node has preferably an application for handling the received messages. In case of GSM/GPRS or UMTS, it might be the USSD application.

In step 202, the CS-node 102 selects an appropriate adapter node IA. This should be done in any suitable way, for example it might be realized in a static way, wherein the operator provides a fixed mapping between a user, which might be identified by means of the MSISDN number and the corresponding adapter node's identifier, like for example the IA address. In other embodiment, there might be mapping between the CS-Node and the IA node. In a more dynamic approach, the CS-node might use a load-sharing algorithm, which might consider the current resource situation of the IA node. Further the terminal might provide the IA identifier, for example when the terminal performs a re-registration and the IA identifier was sent at the initial registration, than the IA identifier is known to the terminal and it might be used when sending a re-registration message. When the identification of the IA is finished, the CS-node forwards 203 the registration message packed again in a CS-transport format towards the IA node, 103. Further the CS-node might add to the registration message further parameters required for the registration, like for example user's identifiers (IMSI, MSISDN).

Figure 3:
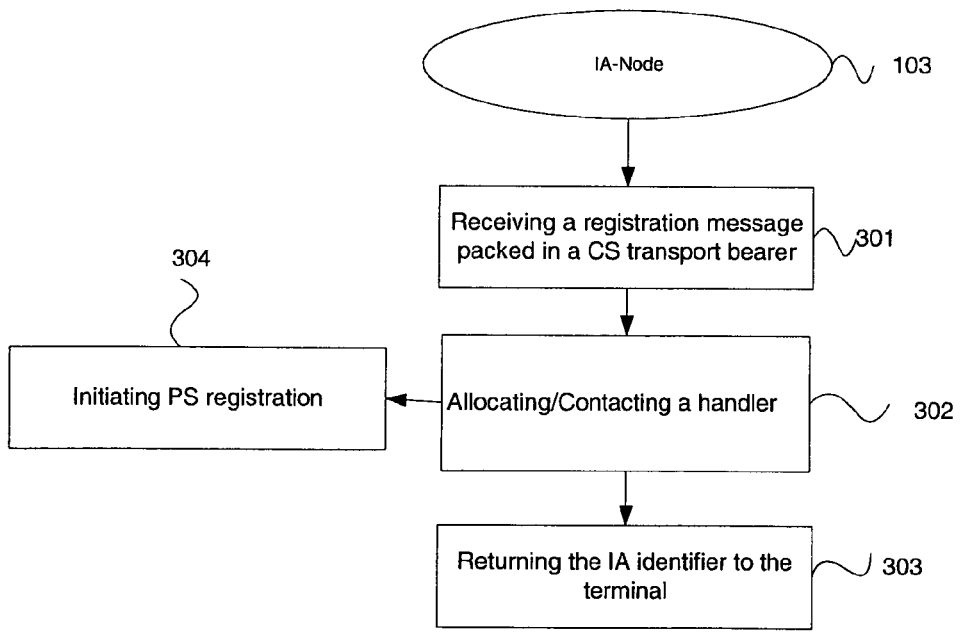

FIG. 3 shows a flow chart of a second method embodiment of the present invention. The method as illustrated in FIG. 3 may be practiced by the adapter node 103 shown in FIG. 1 or by any other adapter node.

By receiving the PS registration message packed in a circuit-switched transport bearer 301, the adapter node contacts a handler for the subscriber 302, wherein if it is an initial registration then a handler is to be allocated at first. If the received message is a re-registration message, then a handler is contacted to get the parameters needed for a registration in the PS-service domain. Further the IA might verify the received subscriber data (IMSI, MSISDN) with the stored data in order to authenticate the user. Preferably the handler is arranged locally in the adapter node and it contains subscriber related data as it is described above (for example IMPU, IMSI, MSISDN). Further, once the parameters for registration are available, the adapter node initiates a registration in the PS-service domain, 304 and the identifier of the adapter done is provided toward the terminal, 303, so that the terminal, like for example a ICS terminal might use it for re-registration. Preferably the adapter node IA identifier indicates also the local handler within the adapter node IA.

Figure 4:
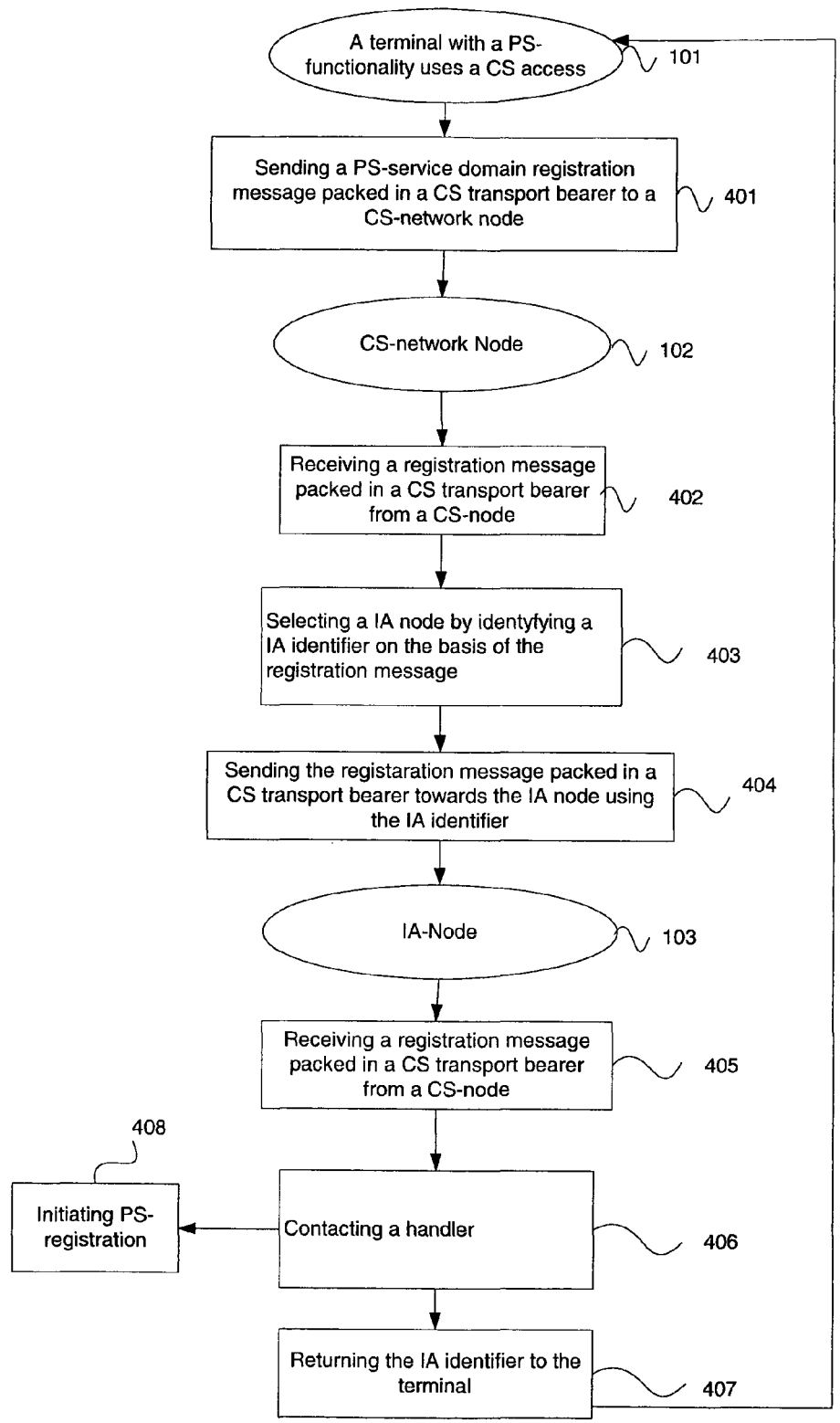
FIG. 4 is a flowchart illustrating embodiments of the method steps performed in the system.

FIG. 4 shows a flow chart of a third method embodiment of the present invention. The method as illustrated in FIG. 4 may be practiced in a system as shown in FIG. 1 or by any other system.

FIG. 4 shows a method steps of a terminal which might be practiced by a terminal 101 shown in FIG. 1, of a CS-network node which might be practiced by a CS node 102 shown in FIG. 1 and of a adapter node which might be practiced by a adapter node 103 shown in FIG. 1.

A terminal (UE) initiates a registration procedure, which is triggered when the UE decides to use CS-access to get PS-services, 101. This is performed in step 401 by sending a registration message towards the CS-node, 102.

Upon reception of the registration message being packed in a CS transport bearer, the CS-node starts a selection procedure of an adapter node, 403, wherein if the registration message is the first one then a IA is to be selected among a number of IAs, otherwise, if the received registration message already includes the IA identifier then the adapter node is addressed directly by means of said identifier. In all of the mentioned cases the goal is that the registration message is sent toward the IA node using the IA address 404. As already mentioned the message might be modified by the CS-node, for example additional parameter may be added, like user's address (IMSI).

The adapter node, after receiving the registration message 405, contacts a handler for the particular subscriber 406, wherein if it is an initial registration then a corresponding handler is to be allocated. In the following step, 407 the identifier is sent to the terminal for storing it. As already mentioned this address might be used for re-registration procedure. The terminal is therefore adapted to determine whether the IA identifier is available or not and according to the availability of this information to build a registration message. Further the terminal is also adapted to receive and store the format of the transport bearer which might be sent to the UE after the initial registration (in case of USSD the USSD Service codes to be used for re-registrations and session setup requests are stored). In step 408 the registration in the PS-service domain is initiated.

The result of the method is that the terminal, ICS terminal and the adapter node, IA are tied together at the initial registration, so that the same IA instance may be used as long as the registration via CS access is active. The tying-up of the ICS terminal and IA may be realized because the adapter node has a proxy node. In the IMS embodiment, the proxy node is a P-CSCF providing for example the contact IP address to the ICS terminal.

Figure 5:
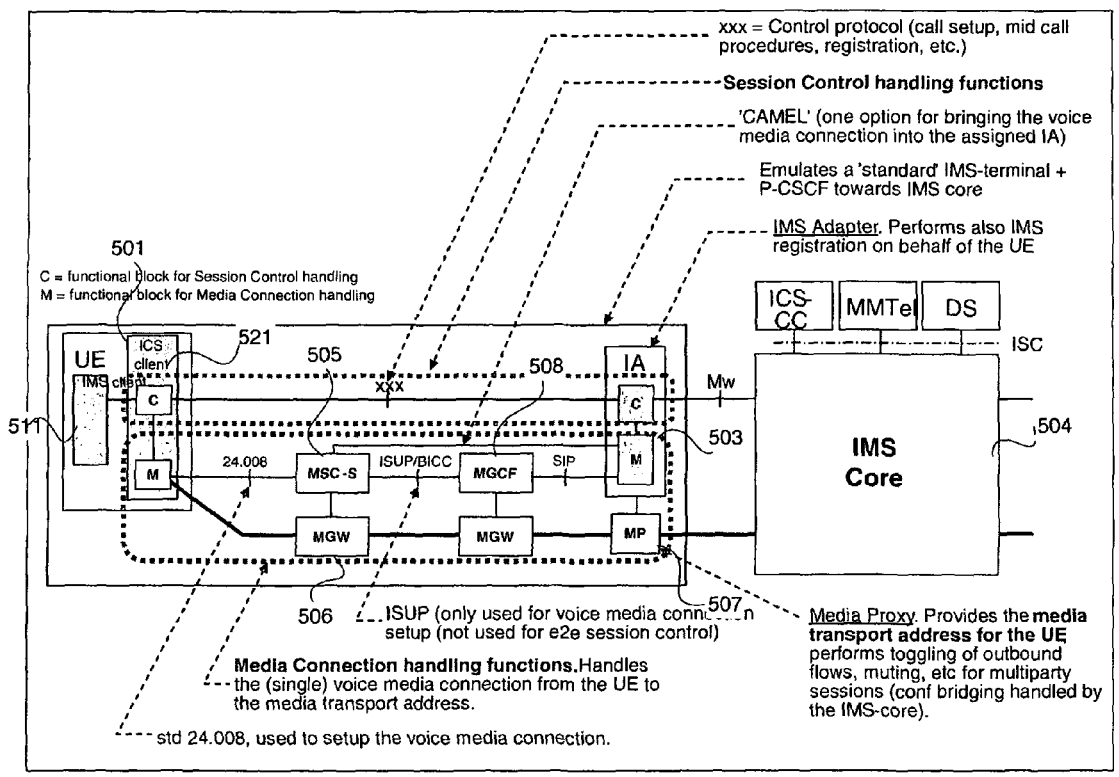
FIGS. 5 to 8 are schematic illustrations of the embodiments.

The network system of FIG. 5 shows a terminal 501, UE, comprising an IMS client 511 which represents a packet-switched functionality and an ICS client 521 with an ICS application (not shown). An MSC-S 505, a Media Gateway (MGW) 506, a Media Gateway Control Function MAGCF 508 performing protocol conversion between e.g. ISUP or BICC and the IMS call-control protocols, like the SIP, an adapter node IA 503 performing registration on behalf of the terminal 501 in the IMS core network 504 and a media proxy MP 507 are additionally included in the system according to FIG. 5. The ICS client includes two functional components reflecting the layered architecture of the network system of FIG. 5. On a control layer, the ICS client includes a functional block 'C' for session control handling. On the payload layer, the ICS client includes a functional block "M" for media connection handling. The individual functional blocks of the ICS client 521 communicate with the corresponding functional blocks on the IA 503 node. Communication on the control layer involves an appropriate control protocol, which in FIG. 5 is depicted as xxx. The function of this protocol might be performed in one embodiment by means of an ICS protocol over USSD as a transport bearer. Further examples are mentioned above, like it might be also a SIP protocol, or an appropriate notification. The communication on the payload layer involves protocols according to the 3GPPtechnical specification 24.008 standard and according to ISUP/BICC and to SIP towards the IA.

The control and the payload layer are attached via the IA 503 and the MP to the IMS 504. As shown in FIG. 5, the IMS 504 includes IMS core as well as IMS application services (such as Multimedia Telephony (MMTEL) services). The IMS core and the IMS application services communicate via the ISC interface using SIP.

The network according to FIG. 5 might be configured to perform the method embodiment discussed above in context with FIG. 4 and in particular the adapter node IA 503 might be configured to perform the method embodiment according to FIG. 3.

In the following different embodiments for the realization of the circuit-switched node according to the present invention are described in the following embodiments.

Figure 6:
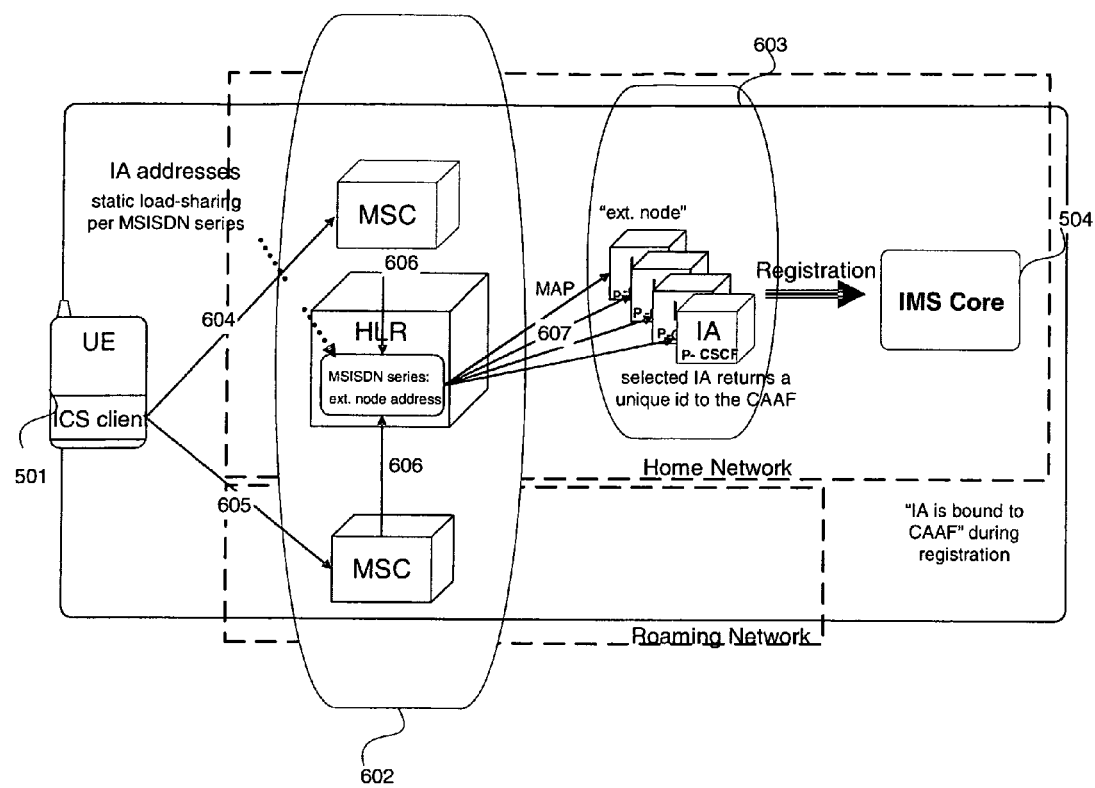

FIG. 6 shows a schematic network system including a terminal UE with an ICS client 501, a circuit-switched network part 602, an adapter node 603 IA communicating with IMS core 504. The circuit-switched node includes MSC and HLR being in a home network and a MSC being located in a visited network. The IA includes the P-CSCF function being an embodiment of packet-switched proxy functionality. Further there are interfaces depicted by means of arrows between the different nodes.

According to FIG. 6 it is assumed that the MSCs do not have a USSD application. There might be different reasons therefore. For example a UE may roam in the home network with a serving MSC not supporting the USSD application 604 or the UE is in a visited network and the serving MSC in the visited network does not support the USSD functionality 605. In these cases the specified handling in the MSC is to forward all USSD requests from the UE to the HLR 606. The HLR has a USSD application, which distributes the USSD requests depending on the indicated USSD Service Code and the MSISDN series of the requesting subscriber to IA node 607. In this embodiment it is assumed that an operator configures the HLR in way the MSISDN numbers of the users are mapped to the IAs. In the HLR the address of the IA is interpreted as an address of an external node to which the data is to be sent.

The IA allocates an internal handler if it is an initial registration for this subscriber and the IMS registration is initiated. Finally the IA returns a routable IA identifier to the requesting ICS client.

The advantage of this approach is the centralized administration in HLR, so that all requests may be handled in said node.

Figure 7:
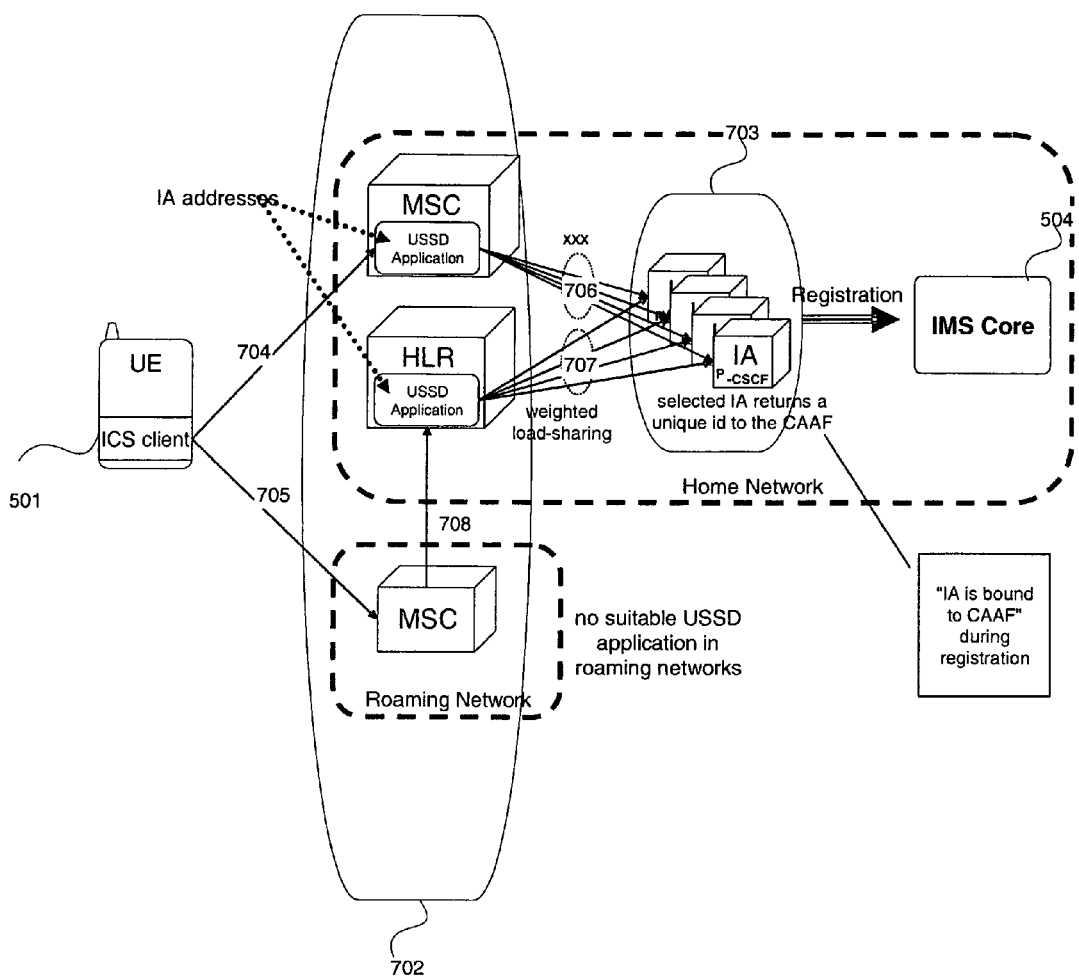

In another approach it is foreseen to provide USSD functionality also in the MSC. FIG. 7 shows a similar system as described in connection with FIG. 6, comprising a terminal UE 501, a circuit-switched network part including a MSC in a home network and a MSC in a visited network as well as HLR and an adapter domain 703 being responsible for the registration in the IMS core 504. The difference is that the MSC in the home network has a USSD application, so that if this MSC is also the serving MSC then upon reception of a USSD message 704 it checks at first whether it is an ICS Registration request. If said message is recognized as the ICS Registration request then it is routed directly to an IA after defining an appropriate IA. The ICS application has an operator administered list of all available IA nodes and the USSD application has the task to choose one IA. In the example according to FIG. 7, the choice of the IA in the MSC is based on a weighted load sharing algorithm in order to avoid an overload in one of the IAs. Consequently the selected message is forwarded to the selected IA, 706.

In case the serving MSC does not have the ICS USSD application, or the serving MSC is in a roaming network and the USSD application is not suitable for the roaming user, the registration request 705 is forwarded to the HLR, 708. In this case the HLR has the specific ICS USSD application and performs IA selection and routing of the registration message 707.

Consequently the IA performs the registration in the IMS core and sends its identifier to the UE. The Registration procedure in the IMS corresponds to the standardized registration procedure in IMS. Since for the IMS the user seems to be an IMS user due to the fact the IA performs the registration using the IMS parameters of the user, like the IMPU address.

Figure 8:
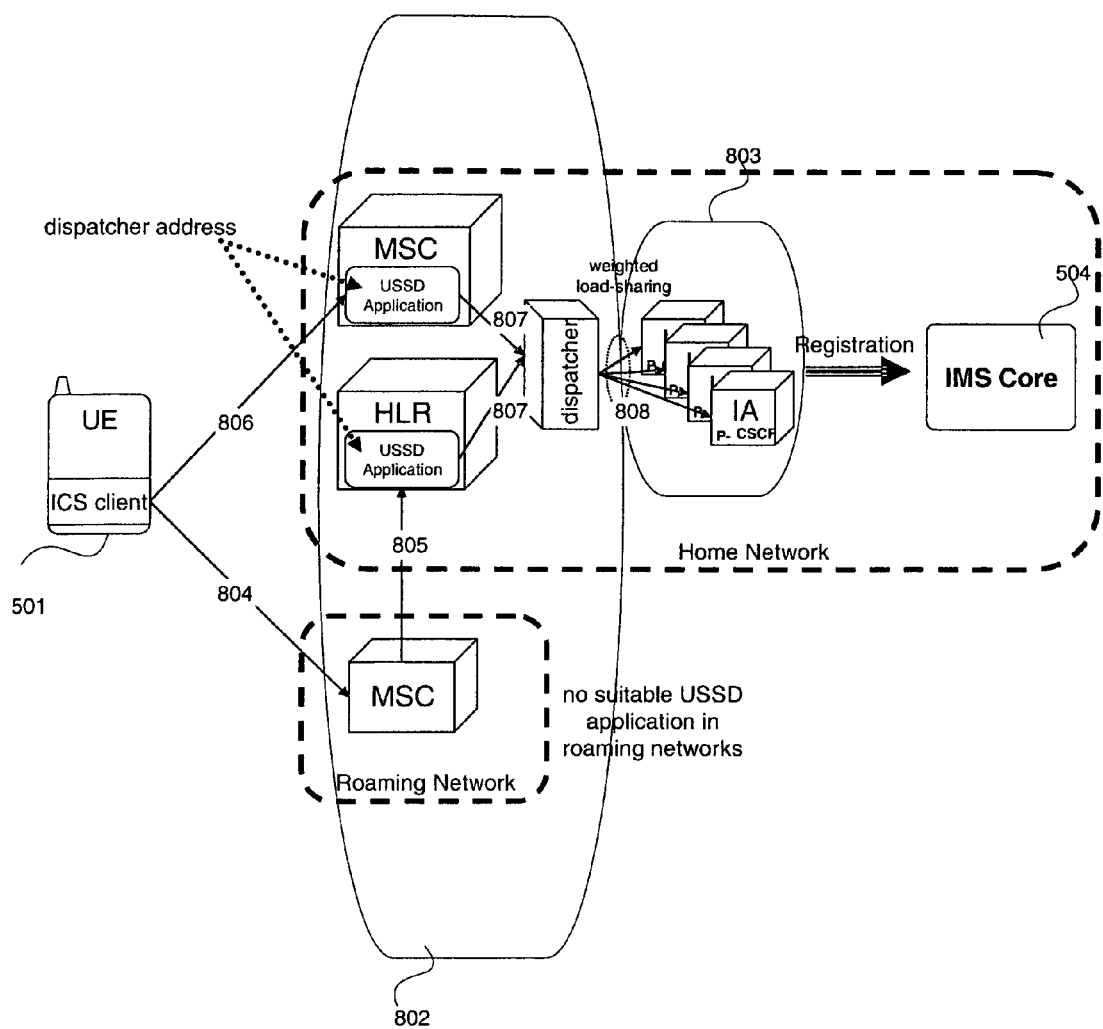

FIG. 8 shows a further embodiment. The network of FIG. 8 corresponds to the schematic representation of the network in FIG. 7 with the difference that a dispatcher located between the MSC or HLR and the IA is responsible for the selection of an appropriate IA. The procedure is similar as described above in connection with FIG. 6 and FIG. 7 with the difference that the MSC or HLR upon reception of a ICS registration message either directly from the UE 806 or indirectly over the path going through visited MSC 804 and 805 forwards said message directly to the dispatcher 807, which in the following selects a IA by applying for example a weighted load-sharing algorithm 808. The advantage of this approach is a simplified ICS USSD application in the MSC and the HLR. In this case the USSD application in the MSC and HLR has to know just the dispatcher address. The Registration procedure in the IA works the same way as described above.

Independent on the embodiment for the realization of the circuit-switched network part, the registration procedure is similar for all embodiments. In the following a preferred embodiment of the registration procedure is presented.

Preferably the first registration is done via HLR with a HPLMN Service Code, which means that the message has to go to the home HLR. After the initial registration is performed, in the response the ICS Client in the UE is informed, which Service Codes are to be used for further procedures. This step is preferably performed in the HLR. For example the HLR may decide how to handle further re-registrations, shall the messages go via the HLR or via the MSC USSD application or how to handle session setups, again shall they go via the HLR or via the MSC USSD application. However in order to take such kind of decision, the HLR shall have information about Service Codes used by USSD handlers in the MSC, and about the availability of USSD handlers in MSC. For example the decision may be based on the HLR load situation or on the availability of an ICS USSD application in the MSC or on the location of the UE (home network or visited network).

Depending on the decision a corresponding Service Code may be send back to the UE or the HLR may store the taken decision and map the messages received from the UE to the taken decision.

The advantage of this procedure is that it offers flexibility to distribute the load between HLR and MSC nodes in the network, and still keeps the control in the HLR what method to use.

In the following embodiments presenting a registration procedure are described in more details with reference to the signaling scenarios of FIG. 9 to 12.

The prerequisite to perform IMS Registration via CS access is that the UE has performed CS IMSI Attach. The IMS Registration and IMS re-Registration may be independent from the CS Location Update procedures, or it may be combined with Location Update for radio optimization reasons, or even be done during an ongoing call. In the following in respect to FIG. 9 to 12 the different possibilities for performing a registration are presented.

Figure 9:
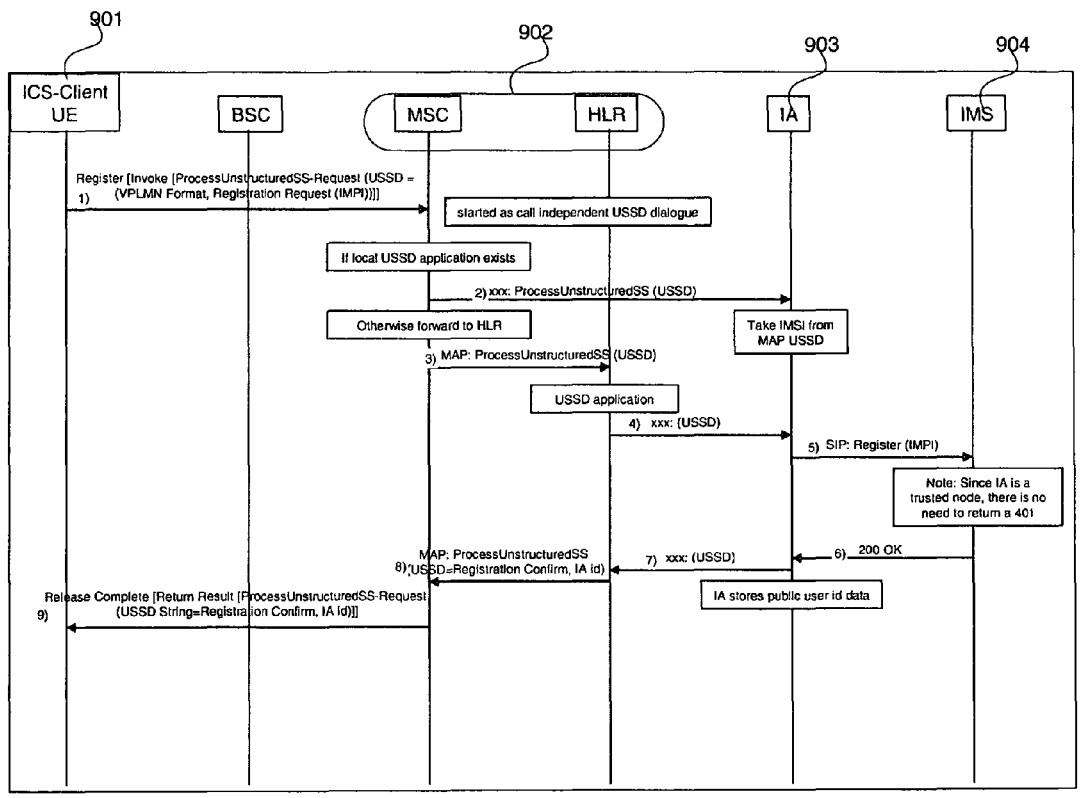
FIGS. 9 to 12 are signalling diagrams illustrating exchange of signals in the embodiments of a network.

A registration via a call independent transaction, which is possible in parallel to an ongoing call is sketched in FIG. 9 and will be briefly explained below. FIG. 9 shows a packet-switched terminal 901 UE with ICS-Client communicating over Base Station Controller BSC with a circuit-switched node CS-node 902 comprising a MSC and a HLR, wherein said CS-node communicates with an adapter node IA 903 in order to get an access to IMS, 904, and the following steps are presented in FIG. 9:

1) the ICS-client initiate a registration in a IMS. A Register message may carry different information. In this example it includes an IMPI needed for the IMS registration and a VPLMN Service Code Format when a UE is in a visited network. Said message packed in a USSD message and is sent to MSC using DTAP protocol as transport protocol for USSD. Here the USSD is send on a call independent transaction.
2) If the MSC supports handling of USSD messages, then a corresponding registration message packed in USSD is sent to a chosen IA Herein any appropriate protocol is to be used (xxx).
3) Otherwise the IMS registration packed in USSD is forwarded to HLR using MAP which is a standardized protocol for communication between different nodes in GSM like MSC and HLR. Further it is proposed in this example that the IA derives the IMPU address from the IMSI address provided with the USSD over MAP as transport protocol.
4) The HLR uses an USSD application to determine a corresponding IA and to send the registration message to the IA. Herein also any appropriate protocol is to be used (xxx).
5)-6) The IA and in particular the integrated P-CSCF initiates the IMS registration in IMS. One of the results of the IMS registration is the provision of a user public address which is preferably stored in the IA.
7)-9) A confirmation message is sent back to the UE using different protocols for carrying the USSD message, wherein the confirmation message includes the identity of the chosen IA.

Figure 10:
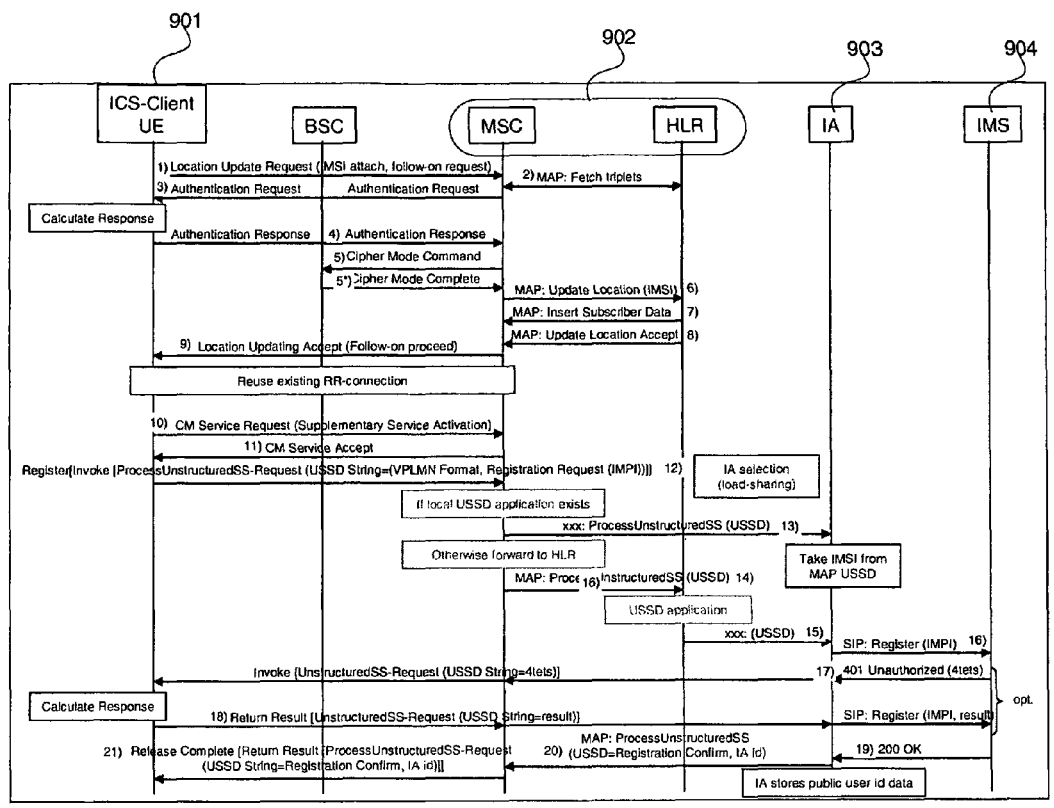

FIG. 10 shows the same schematic nodes as described in respect to FIG. 9. The message flow of FIG. 10 shows a registration being combined (e.g. follow-on procedure) with the CS IMSI attach or CS location update. The advantage of this embodiment is that the radio resource usage is optimized.

The steps 1)-9) are the standardized step for performing a location update in 3GPP TS 24.008 including the request for a follow-on procedure.

10)-11) The request for a call independent SS-procedure is performed in order to open a connection for sending in the following step the USSD messages.

12)-21) are the same steps as steps 1)-9) described above with reference to FIG. 9, therefore they will not be presented again. The difference is the optional steps 17 and 18 wherein additional steps are carried out to ensure the identity of the user. This authentication procedure is standardized in IMS, the challenge solved by the present invention is the conversion of the SIP messages into USSD messages which is done in the IA node. The advantage of the optional steps is an enhanced security.

Figure 11:
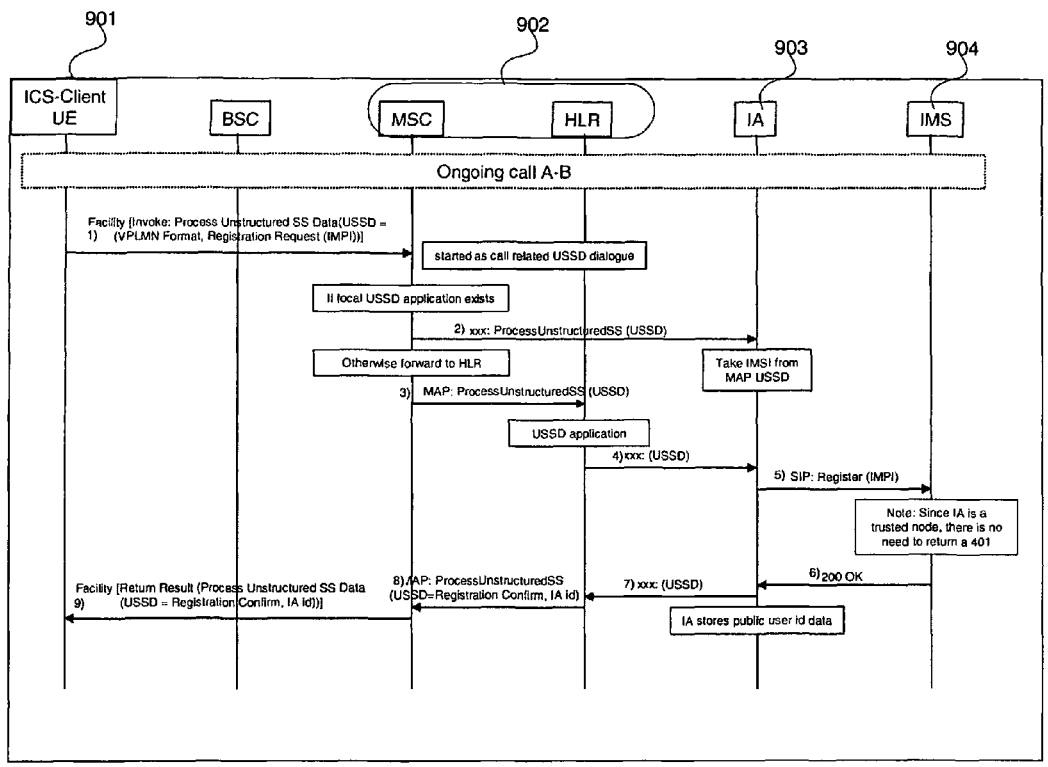

FIG. 11 shows the same schematic nodes as described in respect to FIG. 9 and it presents an embodiment for performing a registration during an ongoing call. In this case the registration signaling can use the already established signaling channel of the CS call. In FIG. 11 the ongoing call A-B is shown and using the already established signaling channel of said call, the same steps 1)-9) as it is described in connection with FIG. 9 are performed. The difference is the name of the DTAP message, "facility" which is a message for service invocation and information exchange during an ongoing call.

As already mentioned the IMS requires that a user sends periodically a message, so called re-registration message in order to ensure that the user is still available and interested in receiving IMS services. As also already mentioned after the initial registration the identifier of the IA is provided to the UE, which uses it to re-register directly in the IMS.

Figure 12:
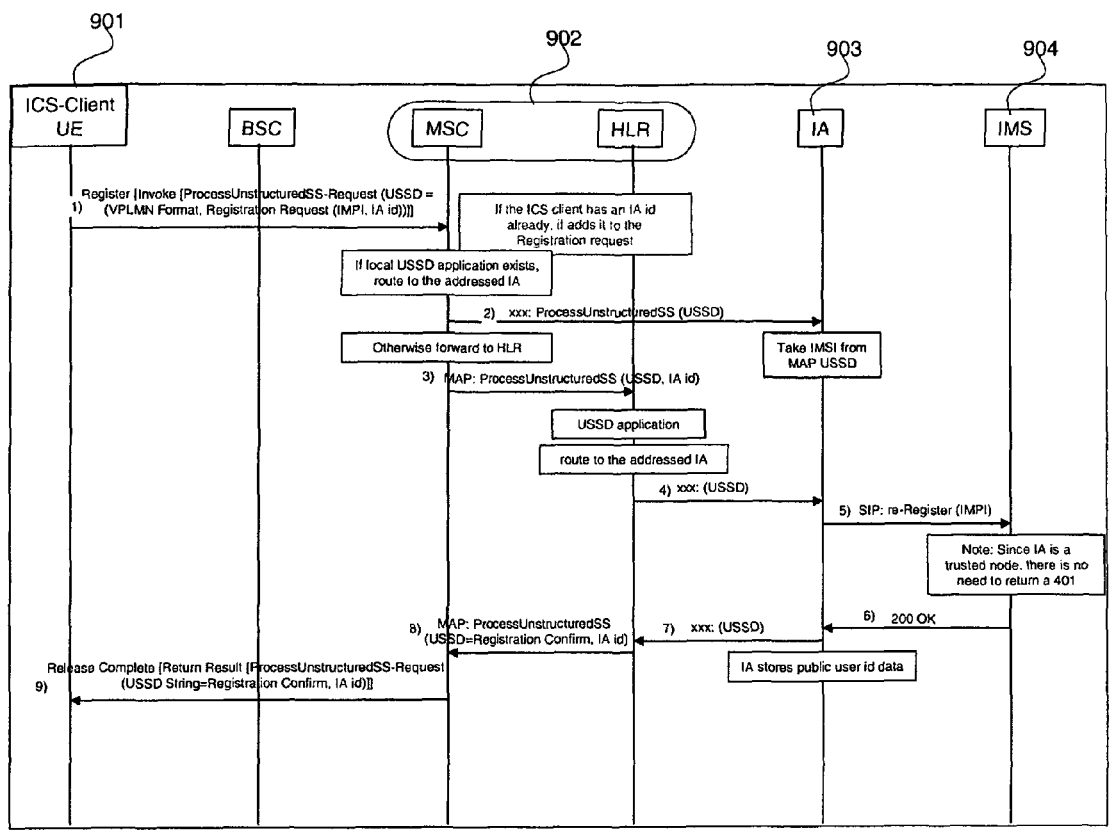

FIG. 12 shows an embodiment for performing a re-registration of a UE in IMS. The nodes of FIG. 12 correspond to the nodes of FIG. 9 and also the steps of FIG. 12 correspond to the steps of FIG. 9. The difference is that the UE has the identifier of the IA, IA id and the terminal adds it to the registration message in step 1). Either the MSC step 2) or the HLR step 3) and 4) route the registration message packed in USSD to the IA using the IA id. Thus the determination of the IA by applying load sharing or by mapping the user to an appropriate IA is not required in this embodiment. Due to the fact that the IA id is used directly no additional authentication is necessary, since the IA is a trusted node for the IMS. The rest of the step is similar to the steps in FIG. 9.

In case a re-Registration via the allocated IA fails, for example due to IA node failure, the ICS client can start a new Registration without indicating an IA id. In this case a new IA node and instance are to be allocated for the ICS client.

A further mechanism which is to be considered is the CS detach procedure, which is started when the user switches off the UE and therefore IMS de-registration cannot be sent from the UE. In this case CAMEL can be used to trigger sending of a Detach Notification to the IA. For this the subscriber data contain information that causes arming of the CAMEL Mobility Trigger for IMSI Detach event. Another scenario is when a user does not have a CS radio contact for a longer time, which means that for example the location update is not performed periodically. In this case it is proposed to let the IMS Registration expire, no additional actions in CS.

In order to ensure security aspects it is proposed that a user shall be authenticated in the CS according to the existing CS rules. So if the UE initiates a call independent transaction for Registration purposes, then the CS access is authenticated. For the IMS Registration, the IA can use the IMPI provided via the USSD dialogue or the IA can derive the IMPI from the provided IMSI as already mentioned. Thus, the IMSI can be provided to the IA; the UE may add it as additional parameter to USSD; the ICS USSD application in the MSC or the HLR may add it to the USSD, MSC or HLR add it to the MAP dialogue towards the IA, which is additional protocol for communicating between HLR or MSC and IA and the IA uses the IMSI from the MAP dialogue to verify a UE provided IMSI.

Although embodiments of the present invention have been illustrated in the accompanying drawings and described in the description, it will be understood that the invention is not limited to the embodiment disclosed herein. IN particular, the invention is capable of numerous rearrangements, modifications and substitutions without departing from the spirit of the invention as set forth and defined by the following claims.

The invention claimed is:

1. A method for registering a terminal, in a packet-switched service domain, over a circuit-switched access domain wherein a circuit-switched network part is provided, the method comprising the steps of the circuit-switched network part:
receiving a packet switched service domain registration message packed in a circuit-switched transport bearer, the packet switched service domain registration message indicating a request for a packet switched service domain registration for registering the terminal;
selecting an adapter node for handling the terminal, on the basis of the received message, by determining the adapter node's identifier wherein the selected adapter node converts the received packet switched service domain registration message into a message of the packet-switched service domain and performs registration of the terminal in the packet-switched service domain on behalf of the terminal; and
sending the packet switched service domain registration message by means of circuit-switched control protocol towards the selected adapter node using the selected adapter node's identifier.

2. The method according to claim 1 wherein the packet switched service domain registration message is a filtered and compressed SIP IMS registration message.

3. The method according to claim 1 wherein the packet-switched service domain registration message is an indication message indicating a request for a packet switched service domain registration.

4. The method according to claim 1 wherein the packet switched service domain registration message is part of a ICS protocol defining a request for the packet switched service domain registration.

5. The method according to claim 1 wherein the registration is an initial registration or a re-registration of the terminal in the packet-switched service domain.

6. The method according to claim 5 wherein the registration is performed via a call independent transaction of an ongoing call.

7. The method according to claim 5 wherein the registration is combined with a location update procedure in the circuit-switched access domain.

8. The method according to claim 5 wherein the registration via the circuit-switched transport bearer is performed within an ongoing call.

9. The method according to claim 1 wherein the selected adapter node's identifier comprises a handler's identity of the terminal within said node.

10. The method according to claim 1 wherein the selecting of the adapter node is based on a weighted, load-sharing.

11. The method according to claim 1 wherein the selecting of the adapter node is based on a pre-defined correlation between the terminal, or a subscriber, and the adapter node's identifier.

12. The method according to claim 1 wherein a circuit-switched network application handles the circuit-switched transport bearer.

13. The method according to claim 12 wherein the circuit-switched transport bearer is USSD.

14. The method according to claim 13 wherein the circuit-switched network part comprises a first circuit-switched network part forwarding the packet switched service domain registration message packed in a circuit-switched transport bearer to a second circuit-switched network part selecting the adapter node.

15. A method for registering a terminal in a packet-switched service domain over a circuit-switched access domain utilizing an adapter node, the method comprising the following steps performed by the adapter node receiving a packet switched service domain registration message packed in a circuit-switched transport bearer from the circuit-switched network node, the packet switched service domain registration message indicating a request for a packet switched service domain registration;

contacting a handler for the terminal for handling a conversion of the received packet switched service domain registration message into a message of the packet-switched service domain; and initiating a registration procedure towards the packet-switched service domain by means of an integrated packet-switched proxy functionality handling on behalf of the terminal.

16. The method according to claim 15 wherein a circuit-switched network application is implemented in the adapter node for handling the circuit-switched transport bearer.

17. The method according to claim 15 wherein the handler comprises subscriber related data.

18. The method according to claim 15 wherein the adapter node sends the adapter node's identifier toward the terminal.

19. A circuit-switched network node for registering a terminal in a packet-switched service domain over the circuit-switched access domain, the circuit-switched network node comprising:

a receiver adapted to receive a packet switched service domain registration message packed in a circuit-switched transport bearer from the terminal, the packet switched service domain registration message indicating a request for a packet switched service domain registration for registering the terminal;

a selection component adapted to select an adapter node on the basis of the received domain registration message by determining the adapter node's identifier wherein the adapter is adapted to convert the received packet switched service domain registration message into a message of the packet-switched service domain and to perform the registration of the terminal in the packet-switched service domain on behalf of the terminal and, a sender adapted to send the packet switched service domain registration message, packed in the circuit-switched transport bearer, towards the selected adapter node.

20. The circuit switched node according to claim 19 wherein the circuit-switched network node is a Home Location Receiver (HLR) communicating with the adapter node and receiving the registration message initiated the terminal.

21. The circuit switched node according to claim 19 where the circuit-switched network node is a Mobile Switching Center (MSC) communicating with the adapter node.

22. The circuit switched node according to claim 19 wherein the circuit-switched network node comprises a dispatcher selecting the adapter node.

23. An adapter node for registering a terminal in a packet-switched service domain having a circuit-switched access, the adapter node comprising a receiver for receiving a packet switched service domain registration message packed in a circuit-switched transport bearer from the terminal, the packet switched service domain registration message indicating a request for a packet switched service domain registration;

a handler for the terminal for handling a conversion of the received packet switched service domain registration message into a message of the packet switched service domain based on subscriber related data; and a registration component for initiating a registration procedure towards the packet-switched service domain by means of a packet-switched proxy functionality handling on behalf of the terminal.

24. A system for registering a terminal in a packet-switched service domain having a circuit-switched access, the system comprising a terminal adapted to generate and to send a packet-switched service domain registration message packed in a circuit-switched bearer to a circuit-switched node wherein the terminal is also adapted to receive and store an adapter node's identifier;

a circuit-switched network part adapted to receive the packet-switched service domain registration message, to select an adapter node by determining the identifier of said node and to send it to said adapter node; and an adapter node adapted to receive the packet-switched service domain registration message to convert the packet-switched service domain registration message into a message of the packet-switched service domain by contacting a handler having subscriber related data, to initiate a registration of the terminal in the packet-switched service domain and to provide the terminal with the adapter node's identifier.

* * * * *